United States Patent Office 3,824,289
Patented July 16, 1974

3,824,289
METHOD FOR THE MANUFACTURE OF TETRAKIS (DIMETHYLAMINO) ETHYLENE
Thomas Liggett, Indian Head, Md., assignor to the United States of America as represented by the Secretary of the Navy
No Drawing. Filed Oct. 21, 1971, Ser. No. 191,560
Int. Cl. C07c 85/00, 85/16
U.S. Cl. 260—583 P                    13 Claims

ABSTRACT OF THE DISCLOSURE

An improved method for the manufacture of tetrakis (dimethylamino) ethylene (TMAE), which comprises the step of reacting chlorotrifluoroethylene (CTFE) with dimethylamine (DMA) wherein the reaction is performed by the under surface addition of CTFE in an excess of DMA and wherein condensers may be used to help control the dissipation of the heat of reaction. The invention also contemplates a new and useful method for separating and recovering excess DMA.

BACKGROUND OF THE INVENTION

Tetrakis (dimethylamino) ethylene (TMAE) is a clear, light yellow, liquid, chemiluminescent material of interest to the millitary services for a variety of operations, as well as being useful as a polymerization initiator, e.g. for vinyl polymerizations. It is useful as an emergency source of light such as is needed when an airplane is disabled. The synthesis of TMAE was first reported in 1950 by R. L. Pruett et al. in "Reactions of Polyfluoro Olefins—Part II. Reactions With Primary and Secondary Amines," J. Am. Chem. Soc., 72:3646–50 (1950). Its preparation has since been described by Boden in U.S. Pat. 3,293,299, issued Dec. 20, 1966, wherein Boden claims improved yields and purity of product. In their disclosures, the DMA and CTFE were charged into a tightly closed, oxygen free, pressure vessel either together at ambient or lower temperatures, or by adding CTFE gas into a vessel containing DMA vapors and liquid. The reaction proceeds according to the generalized equation:

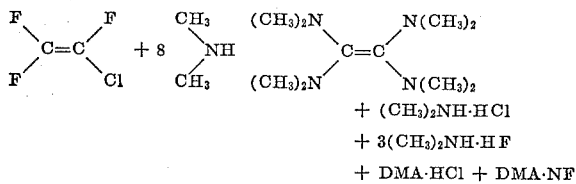

+ (CH₃)₂NH·HCl
+ 3(CH₃)₂NH·HF
+ DMA·HCl + DMA·NF

The Boden patent discloses a multistep process including the following steps:
(1) Reacting the chlorotrifluoroethylene and dimethylamine in an amine: ethylene mole ratio ranging from 8:1 to 20:1 and at a temperature not above 70° C., the pressure being autogenous;
(2) Rising the temperature to 70° C. and separating the lower layer of by-product molten salt;
(3) Cooling the remaining product to room or ambient temperature and drowning the same in 1 to 10 vols. of water per volume of product at 40° C. or lower;
(4) Permitting the drowned product to stand and divide into an upper layer of TMAE and a lower layer consisting principally of water and dissolved by-products and then discharging the lower layer; and
(5) Purifying the resultant TMAE by a second water washing followed by contact with activated alumina or the like as by passage through a column packed therewith, whereby purified TMAE is obtained.

However, the processes of the prior art, especially that of Boden's, have a number of drawbacks, primarily resulting from the large amount of heat given off by the reaction of DMA and CTFE in the gaseous phase. If not satisfactorily dissipated, the heat given off will result in higher temperatures than desired which will produce lower yields as well as an increase in vapor pressure and vapor temperature to values that are considered excessive and dangerous. Furthermore, the vapor temperature increases at a greater rate than the liquid temperature and as a result of this increase a large vapor space is needed in order to control the reactor pressure and vapor temperature. In addition, the problem of heat being dissipated also limits the rate of CTFE being added because as this rate goes up, the amount of heat dissipated goes up.

In order to minimize the problems resulting from the heat given off by the reaction, the prior art utilized controlled temperature water baths or reactor jackets in order to absorb the heat energy by means of direct heat transfer. However, while this approach proved satisfactory in small scale operations, it has been determined to be inadequate in plant scale operations, because it did not always prevent temperature and pressure increase to that level which is considered dangersous and excessive. The problem was magnified by a delayed and sudden release of heat, the magnitude and timing of which were difficult to predict. Furthermore, the use of cold water in a jacket in order to dissipate heat sometimes results in solids being deposited on the reactor side of the jacket wall. The presence of solids greatly decreases the direct heat transfer, resulting in inefficiency as well as difficulty in predicting the actual amount of heat transfer surface needed.

An additional problem of the prior art processes is the fact that the crude product obtained is a dark colored one, while the pure product should have a greenish-yellow fluorescence. Boden attempts to overcome this problem by means of various purification steps after the crude product is obtained.

The processes of the prior art are also faulty in that the DMA is not recycled for further use. Boden teaches a process wherein the TMAE is washed with water to remove the DMA and dissolved dimethylamine hydrofluoride and other by-products until only the TMAE remains. This results in: (1) inefficiency due to the failure to reuse the DMA; and (2) the product of large volumes of obnoxious and smelly solids and contaminated water; thus creating major disposal problems.

SUMMARY OF THE INVENTION

It is an object of the invention to prepare TMAE by an improved method.
It is a further object of this invention to produce TMAE by a method involving greater safety and dependability.
It is an additional object of the instant invention to produce TMAE by means of a process requiring less heat transfer surface.
It is still another object of the present invention to provide a process for producing TMAE in improved yields.
Still another object of the invention is to produce TMAE by means of a process giving an improved quality of product.
A further object of this invention is to produce TMAE by means of a process which will exhibit increased production in a given set of equipment as compared to the other processes for producing TMAE.
It is an additional object of the instant invention to produce TMAE with a minimum of inefficiency.
It is yet another object of the present invention to produce TMAE and, at the same time, to minimize pollution.
These and other objects are accomplished when the prior art processes are improved by adding the CTFE under the liquid surface of the DMA and, optionally, utilizing condensers for the purpose of absorbing heat energy by means of condensation of DMA vapors. The objective of minimum waste and minimum pollution is achieved by means of an improved process of separating and recovering excess DMA from the reaction product.

DETAILED DESCRIPTION OF THE PREFERRED EMBODIMENTS

The objects, advantages and novel features of the invention will become apparent from the following detailed description of the invention.

The problems resulting from the heat given off by the exothermic reaction involved can be, to a large extent, eliminated by adding the CTFE beneath the liquid surface of the DMA so that the reaction no longer takes place in the vapor phase. Boiling DMA removes the heat of reaction by means of its latent heat of vaporization, and this, in conjunction with some external cooling means insures that the vapor temperature is never higher than the boiling temperature of DMA and that the desired temperature is maintained. As a result, a large vapor space is no longer necessary to control the reactor pressure and vapor temperature because the vapor temperature no longer exceeds the liquid temperature and, as a result, the reactor pressure changes only with liquid temperature. As a large vapor space is no longer necessary to control the reactor pressure, the batch size can be more than doubled and is now limited only by the liquid volume of the reactor. Furthermore, since the feed rate of CTFE affects the amount of heat given off by the reaction and was therefore limited in the prior art processes by the cooling available to remove the heat of reaction, a greater feed rate is now permitted because the heat of reaction is more efficiently dissipated. Results have been obtained wherein the feed rate was triple its value of the feed rate for a situation where CTFE gas was added above the surface of the liquid.

Besides the expected advantages of increased capacity and safety resulting from the instant invention, the addition of the CTFE below the surface of the DMA produces the unexpected result that an improved product is obtained. While a dark crude produce was produced when the CTFE was added above the DMA surface, the crude product of the instant invention is an exceptionally light colored TMAE, much closer in appearance to the light colored greenish yellow chemiluminescent liquid which is obtained after purification, than the darker product of the prior art processes.

The inventive concept of adding the CTFE below the liquid surface of the DMA can be applied to any process utilizing the reaction between CTFE and DMA to produce TMAE. For example, the improvement of the instant invention can be utilized in the process of Boden, which is herein incorporated by reference, in order to avoid the problems of Boden. However, it is preferable to use this concept in the type of process that will be described hereinafter. The process can be summarized as a three step one:

(1) Reaction of DMA with CTFE;
(2) Separation of crude TMAE from reaction products; and
(3) Purification of crude TMAE.

The process of the instant invention, wherein the CTFE can be added beneath the surface of DMA already present in a tank, or to DMA in a pipe line mixer, also utilizes, although not as much as required by the prior art processes, additional means of cooling in order to insure the maintenance of the vapor pressured and temperature at a desirable level. While a controlled temperature water bath or reactor jacket can be used, it is much more desirable to either replace with, or add to these means, a condenser, or condensers, for the purpose of condensing DMA vapors. Such a condensation will remove heat energy from the vapor phase and thereby aid in maintaining the desired temperature and pressure, by utilizing the latent heat of evaporation of the DMA for cooling. This gives an ideal method for controlling the vapor pressure and, as a result, controlling the boiling temperature of the DMA, since the boiling temperature is controlled by pressure. In utilizing the condenser, it is preferable to have a vapor line from the top of the reactor to the top of the heat exchanger so the condensate would not have to flow against the upcoming vapors; thus allowing the condenser to remove more heat and give better temperature control than provided by a water cooled jacket. The use of a condenser as a heat exchanger has an additional advantage over the use of a water cooled reactor jacket in that the problem of solids depositing on the side of the reactor is not present and, consequently, one can more accurately predict the amount of heat exchange that will occur.

An additional aspect of the instant invention concerns the sparation and recovery of dimethylamine. The processes of the prior art not only fail to efficiently recycle the DMA but also produce large volumes of obnoxious, smelly solids and contaminated water, creating major disposal problems. Original plans for sea disposal in sealed cans was deemed impractical for large volumes of TMAE.

In the instant invention, after the reaction is completed, the charge is transferred to the treater vessel, where an alkali such as sodium hydroxide or other alkalic metal or alkaline earth metal hydroxides, is added to the charge to neutralize it and release DMA from its salts, dimethylamine hydrochloride (DMA·HCl) and hydrofluoride (DMA·HF). The major part of the DMA is then recovered by distillation, the distillate returning to the DMA tank for reuse. After settling for a period of time, the ingredients remaining in the treater form two layers, the bottom of which is discharged to the waste tank where it is subsequently treated with lime. The lime converts all dissolved fluorides to insoluble calcium fluoride, allowing disposal of the fluoride by land fill operation. The fluorides are the most poisonous constituent of the wastes and any method which will eliminate them will inhibit pollution.

The purification of the crude TMAE is accomplished by washing with dilute alkali followed by water washing. Treatment with alumina resulted in an improvement but its use is not justified because it is only a very slight improvement. Crude plant produced TMAE was so light in color that alumina made no visible change.

While the above method of separating and recovering DMA and then treating the waste product (containing sodium salts, sodium hydroxide, water and some DMA), can be used in any process which prepares TMAE by reacting DMA and CFTE, it is preferable to use this recovery procedure as part of the general procedure which has been set forth above.

In the reaction step, of the general process it has been found that the highest yields are obtained under the following conditions: (1) highest feasible DMA to CTFE ratio; (2) temperature is held below the melting point of by-product salts; and (3) reaction time of about 6 hours.

Since the TMAE reacts with oxygen it is necessary to process TMAE in an inert atmosphere. At temperatures above 70° C. the reaction between TMAE and oxygen is described as uncontrollable and may result in fires or explosions.

In general, the process proceeds as follows. On the day preceding processing fresh DMA from cylinders plus recovered DMA from the previous run are charged into the reactor. The DMA is a liquid at the temperature and pressure in the reactor. On the day of processing, CTFE is added to the reactor through a small tube extending well below the surface of DMA so that the gaseous CTFE reacts with the DMA in the liquid phase. There is an immediate and steady increase in the temperature of the liquid because of the exothermic nature of the reaction. As the temperature increases it may become necessary to provide cooling either by circulating water through the reactor jacket or, more effectively, by circulating water through the condenser located on top of the reactor to condense DMA vapors. After the required amount of CFTE has been added, the cylinder is removed and the temperature of the charge allowed to increase to about 150° F. The reaction is considered complete when the TMAE content of the mixture reaches a maximum. This is usually about 6 hours after the CTFE has been added. At the conclusion of the reaction period the charge is transferred to the treater vessel where an alkali is added in order to neutralize the DMA from its salts so that it may be distilled and reused. After the subsequent distillation of DMA and removal of the lower layer, the upper layer of TMAE is subject to final purification. The purification consists of washing the crude TMAE several times with dilute alkali solution such as a 2 percent sodium hydroxide solution and then with one or more distilled water washes. After draining off the last water wash, the TMAE is heated and subjected to vacuum to effect removal of the residual moisture. The waste material is treated with lime in the waste tank, converting the sodium fluoride to the insoluble calcium fluoride. The calcium fluoride is drawn off into drums and sent to a local land fill operation for disposal.

It is noted that the CTFE is added to the reactor through a small tube extending well below the surface of DMA. Desirable results were obtained when the CTFE entered through a 1/4" stainless steel tube that discharges near the bottom of the reactor where the turbulence from the mechanical agitator was at a maximum. To prevent plugging of this tube, an inert gas such as nitrogen was connected so that residual CTFE could be blown out of the line whenever CTFE feed was stopped or slowed down.

A more detailed description of the general process incorporating all of the novel improvements of the instant invention is set forth in the example, below.

EXAMPLE

Two agitated stainless stel jacketed pressure vessels were purchased and installed. Available condensers were installed on each reactor and connected to a water aspirator as vacuum source. A stainless steel jacketed pressure vessel with condenser was installed to collect and hold DMA. Circulating, hot water systems were provided for the jacket of each reactor and the jacket of the DMA tank. Ample cooling water was also available to each jacket and in all three condensers. Stainless steel piping was provided to feed DMA into either reactor from the DMA tank or cylinders. Stainless steel pipe was also provided for feeding CTFE from the supply cylinder into the top of each reactor. Three hundred p.s.i.g. rupture discs and 150 p.s.i.g safety valves were installed on each reactor, and provision for remote closing of the CTFE feed was made for safety reasons. Stainless teel sample connections, with accompanying vacuum and nitrogen purge fittings, were provided on each reactor.

Before starting operations the system was cleaned, filled with water and then with compressed air, carefully checked for leaks, and dried by heating and evacuation. When moisture was removed, the vacuum was released with DMA vapors. Evacuation and release with DMA vapor was repeated to insure that no oxygen remained. Liquid DMA was then transfered into the reactor from the cylinders or the DMA tank. For the first batch, in which 102 pounds of CTFE react with about 480 pounds of DMA, the reactor was charged 1/3 full of liquid DMA. This was heated to 142° F. in 1/2 hour and then CTFE feed was started. There was no difficulty holding the liquid temperature between 135° and 145° F., but the pressure increased about 10 p.s.i. while the vapor temperature above the liquid rose sharply to 198° F., where it remained during most of the 145-minute CTFE addition. Within 1 hour after stopping the CTFE feed, there was no noticeable exotherm and all cooling was stopped. For the next 5½ hours the liquid temperature was maintained between 149° and 152° F. while the vapor temperature remained about 8° F. lower. The charge was cooled to under 100° F. and left overnight with agitation. TMAE was then separated from the reaction mixture as explained in the following paragraphs on separation.

The second batch was made in the same reactor after thorough cleaning, drying, and removal of oxygen. All the DMA recovered from Batch 1 was used along with 387 pounds of DMA fresh from cylinders and 133 pounds of feed CTFE. The quantity of recycled DMA was estimated by liquid levels in the tanks. Although not accurately known, care was taken to keep the mole ratio of DMA to CTFE well over 10 to 1. On those runs where rough calculations were made, the ratio varied from 11 to 1 to 15 to 1. It was generally preferred to keep the ratio from about 10:1 to about 20:1.

In the second run the CTFE feed was changed so that the CTFE gas would now enter beneath the surface of the liquid DMA. The 1/4-inch stainless steel sample tube was used for this purpose. This line extended to within 1 foot of the bottom of the reactor and discharged into a region where turbulence from the agitator was at a maximum. This change in feed eliminated the high vapor temperatures and pressures encountered in the first run. For the first 1½ hours relatively little cooling was needed. Then maximum cooling was required as the mixture became cloudy and solids formed. CTFE feed was stopped, and the liquid temperature peaked at 156° F. When the liquid temperature reached 150° F., about 20 minutes after the start of crystallization, CTFE feed was continued and cooling reduced to maintain the temperature between 147° and 152° F. for the remainder of processing. Again all noticeable exotherm had ceased within an hour after CTFE addition was completed.

This same exothermic pattern, requiring temporary maximum cooling during first crystallization and no noticeable exotherm within an hour after CTFE feed completion, was observed in most plant processing done on other batches. The crystallization could sometimes be delayed until all CTFE was fed, by keeping the reaction mixture under 140° F. during CTFE addition. When the reaction mixture was kept too cool, or the temperature permitted to rise too rapidly at the start of crystallization, the exotherm was more difficult to control. Following Batch 8, the CTFE feed was started at progressively lower temperatures until, in Batch 18 and all thereafter, the CTFE feed was started at ambient temperature. No harmful effect in yield or operations due to the lower starting temperature was noticed.

The need for the extended heat treatment after the apparent end of the exotherm was shown by an increase in percent TMAE in the reaction mixture with time.

After the reaction step, the separation procedure begins. The charge is transferred to the treater vessel where an excess of commercial 50% caustic solution was used as a neutralizer and to free DMA for distillation and reuse. The excess DMA readily distills off when heat is applied and the vapor line to the condenser is opened. After the distillation, the remaining products separate into two layers, the bottom of which is drawn off to the waste tank for treatment with an excess of lime. The lime insures that all fluorides are converted to insoluble calcium fluoride before washing.

After the crude TMAE was drawn off and stored, the treater was carefully washed out. The treater was then evacuated and the crude TMAE sucked in through a Pall pipeline filter to remove solids. A 2 percent caustic solution was prepared and then the dilute caustic solution was drawn into the treater through polyethylene tubing and thoroughly agitated with the crude TMAE. Vacuum was released with nitrogen gas, and agitation stopped to permit the lower dilute caustic phase to separate. After separation this lower phase was drawn off and discarded. These washes were repeated until impurities were sufficiently removed as indicated by gas chromatographic analysis.

After the caustic washes, one or two 50-gallon distilled water washes were used to remove any traces of caustic which might remain after the final caustic wash.

Full vacuum, less than 50 mm. Hg absolute pressure, was then applied to the treater tank while the contained TMAE was heated to 150° F. with agitation until boiling and all other signs of evolution of moisture ceased. The vacuum was then released with nitrogen and the crude TMAE cooled to ambient temperature, usually overnight.

The purified product was then filtered and packaged under nitrogen with the greatest care to eliminate air contamination. A clear plastic bag with a ½-inch TMAE plastic tube and a ¼-inch nitrogen plastic tube sealed through one corner, was placed over the 5-gallon shipping container on a scale with both tubes inserted into the container. Nitrogen gas under about 5 p.s.i.g. was blown into the container for at least a minute to displace all air. After the scale was adjusted for tare weight, 35 pounds of TMAE were added to the container. The nitrogen was turned off when about half the TMAE was added to prevent splashing. The tubes were removed from the container and the closure made before the plastic bag was moved to the next container.

The closure was then sealed with epoxy resin. When this had set, the outer shipping closure was installed. The first several gallons of TMAE from each lot was used to flush out the filter and tubing. This, plus any left after the last full container, was recycled to a later lot. A 1-gallon reference sample was taken near the middle of each lot. Any not used for analysis was also returned to later lots.

Obviously many modifications and variations of the present invention are possible in the light of the above teachings. It is therefore to be understood that within the scope of the appended claims the invention may be practiced otherwise than as specifically described.

I claim:
1. In the synthesis of tetrakis (dimethylamino) ethylene from excess dimethylamine and chlorotrifluoroethylene in an inert atmosphere, the improvement comprising adding the chlorotrifluoroethylene beneath the liquid surface of the dimethylamine.

2. The process of claim 1 wherein the improvement further comprises utilizing condensors to help dissipate the heat of reaction by condensing dimethylamine vapors.

3. A process for preparing tetrakis (dimethylamino) ethylene comprising: (1) reacting an excess of dimethylamine and chlorotrifluoroethylene at a temperature not to exceed about 70° C. until the reaction is complete, with the proviso that the CTFE gas is added below the liquid surface of the DMA; (2) adding an alkali in order to neutralize the reaction product of step (1); (3) distilling the excess DMA from the neutralized reaction product; (4) separating the remaining neutralized reaction product into a waste layer and a tetrakis (dimethylamino) ethylene layer; and (5) purifying the crude tetrakis (dimethylamino) ethylene.

4. The process of claim 3, wherein condensors are utilized during said reaction in order to dissipate the heat of reaction by condensing DMA vapors.

5. A process according to claim 3, wherein the ratio of DMA to CTFE is at least about 8:1.

6. A process according to claim 3, wherein the ratio of DMA to CTFE is from about 10:1 to 20:1.

7. A process according to claim 1 wherein the ratio of DMA to CTFE varies from about 10:1 to 20:1.

8. A process according to claim 1 wherein the ratio of DMA to CTFE is at least about 8:1.

9. A process according to claim 2 wherein the ratio of DMA to CTFE is at least about 8:1.

10. A process according to claim 2 wherein the ratio of DMA to CTFE varies from about 10:1 to 20:1.

11. The process of claim 3 wherein the waste layer is treated with lime in order to convert the soluble fluorides present into insoluble calcium fluoride.

12. The process of claim 3 wherein the crude tetrakis (dimethylamino) ethylene is purified by washing with dilute alkali, followed by washing with water.

13. The process of claim 12 wherein the alkali is dilute sodium hydroxide.

References Cited

UNITED STATES PATENTS 3,293,299   12/1966   Boden ---------- 260—283 H
3,293,299   12/1966   Boden ---------- 260—583 P

OTHER REFERENCES

J.A.C.S., Vol. 72, August 1948, pp. 3646–50.
Pruett et al.: J. Amer. Chem. Soc., Vol. 72, pp. 3646–3650.
Chem. Eng. Practice, Cremer, Vol. 8, Chemical Kinetics, c. 1965, pp. 357–9.

ELBERT L. ROBERTS, Primary Examiner

D. R. PHILLIPS, Assistant Examiner

U.S. Cl. X.R.

260—583 N, 700, 583 H